United States Patent [19]

Emerson et al.

[11] 4,242,490

[45] Dec. 30, 1980

[54] THERMOSET POLYURETHANE PREPARED FROM A POLYPROPYLENE ETHER TRIOL OBTAINED USING A DOUBLE METAL CYANIDE COMPLEX CATALYST, ETHYLENE GLYCOL AND TOLYLENE DIISOCYANATE

[75] Inventors: Roy J. Emerson, Tallmadge; Hubert J. Fabris; Robert J. Herold, both of Akron, all of Ohio; Joe S. Duncan, Leesburg, Fla.

[73] Assignee: The General Tire & Rubber Company, Akron, Ohio

[21] Appl. No.: 59,342

[22] Filed: Jul. 20, 1979

[51] Int. Cl.$^3$ ............................................. C08G 18/48
[52] U.S. Cl. ..................................................... 528/77
[58] Field of Search ............................................ 528/77

[56] References Cited

U.S. PATENT DOCUMENTS

| | | | |
|---|---|---|---|
| 3,746,692 | 7/1973 | Olstowski et al. | 528/77 |
| 3,829,505 | 8/1974 | Herold | 528/76 |
| 3,993,576 | 11/1976 | Barron | 528/77 |
| 4,119,594 | 10/1978 | Iobst et al. | 528/77 |

*Primary Examiner*—Maurice J. Welsh

[57] ABSTRACT

A thermoset, segmented and elastomeric polypropylene ether urethane is made by reacting together tolylene diisocyanate, ethylene glycol and a polypropylene ether triol having an average molecular weight of from 7,000 to 14,000, in certain ratios. The resulting polyurethane exhibits a temperature retraction TR-10 of less than about −35° C. and a Goodyear-Healy rebound of greater than about 55%.

5 Claims, No Drawings

THERMOSET POLYURETHANE PREPARED FROM A POLYPROPYLENE ETHER TRIOL OBTAINED USING A DOUBLE METAL CYANIDE COMPLEX CATALYST, ETHYLENE GLYCOL AND TOLYLENE DIISOCYANATE

This invention relates to thermoset, segmented polypropylene ether urethane elastomers.

BACKGROUND

Commercially available polypropylene ether triols are produced by the conventional base catalyzed process which results in increased levels of unsaturation and a corresponding loss in hydroxyl functionality as the molecular weight of the triol increases up to a value of about 6,000. Therefore, high functionality polypropylene ether triols with average molecular weights higher than about 6,000 cannot be made using the base-catalyzed process, or if made, these conventional polypropylene ether triols are not suitable due to low functionality to make segmented thermosetting polyurethane elastomers exhibiting good properties by reaction with organic diisocyanates in admixture with a chain extender.

Accordingly, it is an object of this invention to overcome the difficulties alluded to hereinabove and to provide a thermoset and segmented polypropylene ether urethane elastomer having desirable property balance and in particular good low temperature properties. These and other objects and advantages of the present invention will become more apparent to those skilled in the art from the following detailed description and working examples.

SUMMARY OF THE INVENTION

According to the present invention it has been discovered that thermoset, segmented and elastomeric polypropylene ether urethanes having a temperature retraction TR-10 of less than about −35° C. and a Goodyear-Healy rebound of greater than about 55% can be made by reacting tolylene diisocyanate, ethylene glycol, and a polypropylene ether triol having an average molecular weight of from 7,000 to 14,000 where the weight ratio of tolylene diisocyanate plus ethylene glycol to the polypropylene ether triol is from about 0.4:1 to 1.0:1 and where the equivalent ratio of the tolylene diisocyanate to the ethylene glycol plus the polypropylene ether triol is from about 1:0.90 to 1:1.05. The polypropylene ether triol used is made by reacting propyleneoxide with a low molecular weight triol using a polymerization catalyst of the double metal cyanide class.

These high molecular weight, high functionality polypropylene ether triols enable the production of segmented thermoset polypropylene ether urethane elastomers with adequate mechanical properties, having much better low temperature flexibility than urethane elastomers made with the lower molecular weight conventional polypropylene ether triols. Also, these new elastomers made with the high molecular weight polypropylene ether triols have higher resilence than the urethane elastomers made with the lower molecular weight polypropylene ether triols.

The improved low temperature flexibility and improved resilence obtained from use of the higher molecular weight polypropylene ether triols in making the thermoset elastomeric urethanes is believed to be due to better phase separation of the hard (tolylene diisocyanate plus ethylene glycol) segments and soft (polypropylene ether) segments caused by the decrease in the number of hard segments formed and the increase in molecular weight of each hard segment as well as an increase in molecular weight of each soft segment.

DISCUSSION OF DETAILS AND PREFERRED EMBODIMENTS

The polypropylene ether triol used in the practice of the present invention is made by the polymerization of propylene oxide in the presence of an initiator, a low molecular weight triol, using as a polymerization catalyst a double metal cyanide complex compound according to the teaching of U.S. Pat. No. 3,829,505. Examples of low molecular weight triols to use as initiators are trimethylol propane, 1,2,6-hexane triol, tripropylene oxide adduct of glycerol or hexane triol, phloroglucinol, 4,6,4'-trihydroxy diphenyl dimethyl methane, and the like and mixtures of the same. The polymerization may be conducted in bulk or solvent. A solvent may be required when the propylene oxide and initiator are not miscible or soluble in order to facilitate polymerization. Polymerization is conducted to obtain polypropylene ether triols of an average molecular weight of from 7,000 to 14,000. A feature of the use of the double metal cyanide catalyst is the ability to get high molecular weight poly-propylene ether triols in contrast to the limiting value of about 6,000 when alkali catalysts are used. In other words the use of alkali catalysts to produce high molecular weight, hydroxy terminated polypropylene ethers results in a substantial loss in a hydroxy functionality while using the double metal cyanide catalyst one is able to obtain near theoretical hydroxy functionality (i.e. 3, if a triol is used as initiator for the PO polymerization) at even very high molecular weights.

Catalysts of the double-metal cyanide class are well known. Methods for making these catalysts are disclosed by U.S. Pat. Nos. 3,427,256; 3,427,334 and 3,427,335. Methods for making polypropylene ether triols with these double metal cyanide catalysts having a high molecular weight, having a high hydroxyl functionality and having low unsaturation are shown by U.S. Pat. Nos. 3,829,505 and 3,941,849 (a division).

Ethylene glycol used in the practice of the present invention is a well known compound.

Likewise, tolylene diisocyanate is well known. Examples of tolylene diisocyanate are 2,4-tolylene diisocyanate and 2,6-tolylene diisocyanate. Mixtures of tolylene diisocyanates can be used such as a mixture of 80% by weight of 2,4-tolylene diisocyanate and 20% by weight of 2,6-tolylene diisocyanate (known as 80/20 2,4-/2,6-TDI). Also, known is another mixture of 65/35 2,4-/2,6-tolylene diisocyanates. Preferred is an 80/20 mixture of 2,4 and 2,6 tolylene diisocyanates.

The polyurethanes of the present invention may be made by the prepolymer process or the one-shot process. Urethane forming catalysts can be used as well as antioxidants or other antidegradants. The components may be mixed with the usual compounding ingredients, e.g., fillers and pigments like clay, silica, carbon black, phthalocyanine blue or green, $TiO_2$, U-V absorbers, $MgCO_3$, $CaCO_2$ and so forth. Plasticizers, also, may be used, but excellent low temperature properties are obtained without plasticizers. The polyurethane may be molded under nitrogen or under conditions to exclude water for best results at reasonable times and temperatures. For more information on making polyurethanes see "Polyurethanes Chemistry And Technology," Part II, Technology, Saunders and Frisch, Interscience Publishers a division of John Wiley & Sons, New York, 1964.

The thermosetting polyurethanes of the present invention are useful for the production of bushings, shoe soles and heels, sight shields for automobiles, energy absorbing bumpers and other automotive items.

The following examples will serve to illustrate the present invention with more particularity to those skilled in the art. In these examples, parts are parts by weight unless otherwise designated. The ingredients were mixed together rapidly (one-shot process) and cured under nitrogen in sealed containers at the temperatures and for the times shown. Selected mechanical properties of the polymers obtained are also shown in these examples.

EXAMPLE I

|  | Parts By Weight | |
|---|---|---|
|  | Run 1 | Run 2 |
| Formulation |  |  |
| 4,000 M.W.PPET(A) | 100 | — |
| "Poly G"-4030-PG (B) | — | 100 |
| 80/20, 2,4/2,6 TDI (tolylene diisocyanate) | 70.6 | 70.7 |
| "Metasol" 57[1] | 0.2 | 0.2 |
| Ethylene glycol | 22.3 | 22.4 |
|  | 193.1 | 193.3 |
| Elastomer Properties (Cured 2 Hrs. @ 100° C.) |  |  |
| Modulus, 10%, psi | 180 (1.24)[2] | 115 (0.79) |
| Modulus, 100%, psi | 820 (5.66) | 650 (4.48) |
| Tensile, psi | 1110 (7.66) | 1110 (7.66) |
| Elongation, % | 150 | 220 |
| Shore A hardness | 82 | 78 |
| Goodyear-Healy Rebound, %[3] | 47 | 44 |
| TR-Test, °C. (C) |  |  |
| TR-5 | −30 | −35 |
| TR-10 | −26 | −28 |
| TR-20 | −22 | −24 |
| TR-30 | −20 | −21 |
| TR-40 | −18 | −18 |
| TR-50 | −13 | −14 |
| TR-60 | −12 | −10 |
| TR-70 | −9 | −6 |
| TR-80 | −3 | −1 |

[1]Phenyl mercuric propionate, Merck & Co., Inc., catalyst.
[2]Values in parentheses are in Megapascals.
[3]ASTM D 1054-66 (Reapproved 1972)

Example I shows the properties of thermoset elastomers prepared with 4,000 molecular weight polypropylene ether triols made using the complex cyanide catalyst and a commercial triol. The physical properties are almost identical, especially with respect to resilience (Goodyear-Healy rebounds of 47% and 44%) and low temperature performance (TR-10 values of −26° C. and −28° C.). This shows that the commercial triol and the triol made with complex cyanide catalyst are equivalent in this experiment at the 4,000 molecular weight level. The resulting elastomers have about the same weight ratio of high melting (urethane:tolylene diisocyanate+ethylene glycol) segments to polyether segments.

EXAMPLE II

|  | Parts By Weight | |
|---|---|---|
|  | Run 1 | Run 3 |
| Formulation |  |  |
| 4,000 M.W. PPET(A) | 100 | — |
| 9,000 M.W. PPET(A) | — | 100 |
| 80/20, 2,4/2,6 TDI | 70.6 | 69.7 |
| "Metasol" 57 | 0.2 | 0.2 |
| Ethylene glycol | 22.3 | 23.3 |
|  | 193.1 | 193.2 |
| Elastomer Properties (Cured 2 hrs. @ 100° C.) |  |  |
| 10% Modulus, psi | 180 (1.24) | 115 (0.79) |
| 100% Modulus, psi | 820 (5.66) | 600 (4.14) |
| Tensile, psi | 1110 (7.66) | 690 (4.76) |
| Elongation, % | 150 | 130 |
| Shore D hardness | 30 | 27 |
| Goodyear-Healy Rebound, % | 47 | 59 |
| TR-test, °C. (C) |  |  |
| TR-5 | −30 | −53 |
| TR-10 | −26 | −50 |
| TR-20 | −22 | −49 |
| TR-30 | −20 | −47 |
| TR-40 | −18 | −45 |
| TR-50 | −13 | −44 |
| TR-60 | −12 | −42 |
| TR-70 | −9 | −38 |
| TR-80 | −3 | −35 |
| TR-90 |  | −21 |

Example II compares properties of thermoset elastomers made with 4000 and 9000 molecular weight polypropylene ether triols made using a complex cyanide catalyst. The higher molecular weight imparted higher rebound (59% vs 47%) and lower TR-10 (−50° C. vs. −26° C.).

EXAMPLE III

|  | Parts By Weight | | |
|---|---|---|---|
|  | Run 4 | Run 5 | Run 6 |
| Formulation |  |  |  |
| "NIAX" Polyol 11-27 (D) | 100 | — | — |
| 9600 M.W. PPET (A) | — | 100 | — |
| 12000 M.W. PPET (A) | — | — | 100 |
| 80/20 2,4/2,6 TDI | 60.4 | 60.0 | 59.9 |
| "Metasol" 57 | 0.2 | 0.2 | 0.3 |
| Ethylene Glycol | 19.6 | 20.0 | 20.1 |
|  | 180.2 | 180.2 | 180.3 |
| Elastomer Properties (Cured 30' @ 135° C.) |  |  |  |
| 10% Modulus, psi | 865 (5.97) | 137 (0.94) | 149 (1.03) |
| 100% Modulus, psi | 1425 (9.83) | 1300 (8.97) | 1110 (7.66) |
| Tensile, psi | 2840 (19.59) | 3730 (25.72) | 3590 (24.76) |
| Elongation, % | 250 | 280 | 240 |
| Shore D hardness | 49 | 35 | 30 |
| Goodyear-Healy Rebound, % | 48 | 71 | 78 |
| TR-test, °C. (C) |  |  |  |
| TR-10 | −27 | −54 | −56 |
| TR-50 | −3 | −46 | −50 |
| TR-70 |  | −39 | −46 |
| TR-80 |  | −34 | −43 |
| TR-90 |  | −29 | −35 |

Example III compares properties of thermoset elastomers made with a 6233 molecular weight commercial triol and 9600 and 12,000 molecular weight triols made using a complex cyanide catalyst. The Healy rebound values were 48%, 71% and 78%, respectively, for the elastomers made with the 6233 M.W., 9600 M.W., and 12,000 M.W. triols. The TR-10 values were −27° C., −54° C. and −56° C., respectively, for the 6233 M.W., 9600 M.W. and 12,000 M.W. triols.

A brief recapitulation of the data of Runs 1 to 6 is shown in the table below:

TABLE

| Run No. | M.W. of Triol Used | Elastomer Temp. Ret. TR-10, °C. | Healy Rebound, % |
|---|---|---|---|
| 1 | 4,000# | −26 | 47 |
| 2 | 4,000## | −28 | 44 |
| 3 | 9,000# | −50 | 59 |
| 4 | 6,233## | −27 | 48 |
| 5 | 9,600# | −54 | 71 |
| 6 | 12,000# | −56 | 78 |

Made with cyanide catalyst
Commercially made

Notes for above examples: A-Polypropylene ether triol made by reacting propyleneoxide with 1,2,3-(trihydroxypropoxy) propane as aninitiator using a glyme zinc cobaltic cyanide catalystaccording to the teachings of U.S. Pat. No. 3,829,505. The molecular weights shown are average molecularweights. B-Commercial propylene ether polyol (triol) havingan average molecular weight of 4,000 and average OHfunctionality of 42. Olin Corp. C-Temperature retraction test. See ASTM D 1329-72. Ingeneral, the test is carried out by (1) elongating thespecimen, (2) locking it in the elongated condition,(3) freezing it to practically a nonelastic state,(4) releasing the frozen specimen and allowing it toretract freely while raising the temperature at auniform rate, (5) reading the length of the specimenat regular temperature intervals while it is retracting,and (6) computing the percentage retractionvalues at these temperatures from the data obtained. D-Commercial polypropylene ether polyol (triol), endcapped, OH number of 27 and an average molecularweight of about 6,233. Union Carbide Corp.

We claim:

1. A thermoset, segmented and elastomeric polypropylene ether urethane consisting essentially of the reaction product of tolylene diisocyanate, ethylene glycol and a polypropylene ether triol having an average molecular weight of from 7,000 to 14,000, the weight ratio of tolylene diisocyanate plus ethylene glycol to the polypropylene ether triol being from about 0.4:1 to 1.0 to 1, the equivalent ratio of the tolylene diisocyanate to the ethylene glycol plus the polypropylene ether triol being from about 1:0.90 to 1:1.05, the temperature retraction TR-10 of the polypropylene ether urethane being less than about −35° C. and the Goodyear-Healy rebound of the polypropylene ether urethane being greater than about 55%, the polypropylene ether triol having been made by the reaction of propylene oxide with a low molecular weight triol using a polymerization catalyst of the double metal cyanide complex class.

2. A polypropylene ether urethane according to claim 1 in which the tolylene diisocyanate is an 80/20 percent by weight mixture of 2,4- and 2,6-tolylene diisocyanates.

3. A polypropylene ether urethane according to claim 2 in which the polypropylene ether triol has an average molecular weight of 9,000.

4. A polypropylene ether urethane according to claim 2 in which the polypropylene ether triol has an average molecular weight of 9,600.

5. A polypropylene ether urethane according to claim 2 in which the polypropylene ether triol has an average molecular weight of 12,000.